United States Patent [19]

Rymal

[11] Patent Number: 4,851,133
[45] Date of Patent: Jul. 25, 1989

[54] METHOD AND APPARATUS FOR RECOVERING LOW DENSITY LIQUIDS IN SURFACE WATER

[76] Inventor: Ted R. Rymal, 1907 N. Frazier, Conroe, Tex. 77305

[21] Appl. No.: 210,743

[22] Filed: Jun. 23, 1988

[51] Int. Cl.[4] .............................................. E02B 15/04
[52] U.S. Cl. .................................... 210/776; 210/128; 210/242.3; 210/923
[58] Field of Search .............. 210/776, 923, 121, 128, 210/242.3; 440/5

[56] References Cited

U.S. PATENT DOCUMENTS

| | | | |
|---|---|---|---|
| 3,700,108 | 10/1972 | Richards | 210/242.3 |
| 3,708,070 | 1/1973 | Bell | 210/242.3 |
| 3,823,828 | 7/1974 | Derzhavets et al. | 210/242.3 |
| 3,844,944 | 10/1974 | Mercuri | 210/242.3 |
| 3,860,519 | 1/1975 | Weatherford | 210/242.3 |
| 3,966,615 | 6/1976 | Petchul et al. | 210/242.3 |
| 4,045,344 | 8/1977 | Yokota | 210/106 |
| 4,123,357 | 10/1978 | Clements et al. | 210/774 |
| 4,151,081 | 4/1979 | Bolli et al. | 210/242.3 |
| 4,356,086 | 10/1982 | Oberg | 210/242.3 |
| 4,372,854 | 2/1983 | Szeveday | 210/242.3 |
| 4,487,694 | 12/1984 | Brandt et al. | 210/242.3 |
| 4,492,630 | 1/1985 | Rymal, Jr. | 210/117 |
| 4,597,863 | 7/1986 | Rymal, Jr. | 210/117 |

FOREIGN PATENT DOCUMENTS

| | | |
|---|---|---|
| 2152295 | 4/1973 | France . |
| 7113498 | 4/1972 | Netherlands . |
| 938509 | 4/1983 | U.S.S.R. . |
| 1199729 | 7/1970 | United Kingdom . |

*Primary Examiner*—Peter Hruskoci
*Assistant Examiner*—Christopher Upton
*Attorney, Agent, or Firm*—Browning, Bushman, Zamecki & Anderson

[57] ABSTRACT

An improved skimmer is provided for recovering hydrocarbons floating on the surface of a body of water. A floating hull defines first and second tunnels, and a holding tank for housing the collected hydrocarbons. A power driven propeller in the first tunnel draws subsurface water from an inlet port through the first tunnel and out a discharge port. The inlet port of the second tunnel is positioned above the first tunnel to receive floating hydrocarbons and water. The second tunnel has a water outlet in fluid communication with the first tunnel. A skimming gate passes hydrocarbons floating on the surface of water in the second tunnel to the holding tank, and thereby separates hydrocarbons from the water. According to the method of the present invention, hydrocarbons are efficiently recovered from the surface of the water while a high percentage of water initially collected with the hydrocarbons to assist in the recovery operation is discharged back to the body of water, thereby reducing the quantity of hydrocarbons which must be transported from the holding tank on the hull.

20 Claims, 1 Drawing Sheet

METHOD AND APPARATUS FOR RECOVERING LOW DENSITY LIQUIDS IN SURFACE WATER

BACKGROUND OF THE INVENTION

1. Field of the Invention

The present invention relates to techniques for recovering liquids on the surface of a body of water and, more particularly, to improved skimming techniques for recovering hydrocarbon-based fluids, such as oil or gasoline, from the surface water.

2. Description of the Background

Various equipment has been devised for recovering low density fluids, such as oil, from surface water. In most cases, the recovery of this oil is required due to the adverse environmental consequences of oil in a water supply. Probably the most widely used equipment for this purpose is skimming equipment, which separates the oil from the water by allowing the oil to naturally float to the surface of the water due to the density variance. Conventional skimming equipment uses a weir to separate the oil (with some water) from the remaining body of water. Permanent skimming equipment is commonly in place, for example, in waste treatment ponds adjacent industrial and petrochemical facilities to recover small quantities of oil discharged with water from the facility before the water is returned to a river or other water supply.

When oil is unexpectedly encountered on the surface of a body of water, or is encountered in unusually high concentrations, it is often preferable to utilize a power driven hull to assist in hydrocarbon collection. Such hulls have, for example, been provided with endless belts which are lowered into the water to pick up the oil. The oil is removed from the belt by a squeegee device or other suitable extraction equipment. The collected oil is stowed in a compartment in the hull while the cleaned belt returns to the water. An advantage of this system is that the hull can be easily steered or manipulated to desired locations on the body of water which evidence large oil slicks.

Hulls also have been employed with hydrocarbon recovery systems utilizing a ring-shaped weir or boom to collect the oil within the perimeter of the boom and adjacent the hull so that the oil can be retrieved at a location adjacent the hull. The surface water containing the oil may be drawn into a holding tank in the hull. Alternatively, the oil may be allowed to rise to the surface of the water in the hull holding tank, so that the oil and some water can be collected in a separate tank while most of the water originally drawn into the hull is directed back to the pond or body of water.

Another type of skimming device is disclosed in U.S. Pat. No. 4,597,863. This hull-like device does not utilize a floating weir, but utilizes the engine propeller to draw the surface oil/water mixture into the hull, where the water is separated by a sophisticated oil/water separator within the vessel. This system has several significant advantages compared to a system which utilizes a external floating boom, particularly in that the hull may be easily manipulated to a location in the body of water where it may be most effective. The system is also designed so that the oil slick on the surface of the water will be drawn to the hull.

Although the hydrocarbon system described in the '863 patent has several significant advantages over other prior art hydrocarbon recovery techniques, it is relatively complex and thus expensive. In part, this complexity and expense is due to the sophisticated oil/water separator on the hull. Moreover, the unit is intended to prevent a frontal wake and minimize "pushing" the surface water away from the hull during the skimming operation, although its efficiency is limited by either decreased skimming speed, or the creation of a frontal wake and thus decreased oil recovery performance.

The disadvantages of the prior art are overcome by the present invention, and improved methods and apparatus are hereinafter disclosed for efficiently recovering low density fluids, such as hydrocarbons, on the surface of a body of water.

SUMMARY OF THE INVENTION

The methods and apparatus of the present invention may be efficiently employed for recovering oil floating on the surface of a body of water, e.g., a waste treatment pond adjacent a petrochemical facility. The unit comprises a light-weight hull having a pair of pontoons, and a power source for driving a propeller to controllably maneuver the hull to selective positions on the surface of the pond and/or draw the floating oil to the hull for recovery. A first tunnel is provided in the lower portion of the hull, and a propeller is positioned within the first tunnel for drawing a substantial quantity of water through the first tunnel during the skimming operation, thereby preventing the creation of a frontal wake and thus increasing the efficiency with which oil is collected within the hull.

A second tunnel is provided with its inlet above the first tunnel for receiving a selected upper thickness of oil/surface water, with a contoured gate selectively positionable with respect to the hull preferably separating the first and second tunnels. The second tunnel has a lower water outlet which merges into the first tunnel, so that a substantial quantity of water entering the second tunnel is discharged into the first tunnel and thus discharged back into the pond. The second tunnel has an upper oil outlet defined by a buoyancy responsive gate positioned above a wall stationary with respect to the hull and having its base adjacent the water outlet. The size of the oil outlet is thus controlled by a floating buoyancy-responsive gate, so that oil within the second tunnel passes over the gate and into a storage tank between the floating pontoons. A storage tank, in turn, is connected by a flexible fluid line to an on-shore truck with a holding tank or to an on-shore or off-shore holding vessel. The quantity of oil in the hull's storage tank may thus be controlled by continually or intermittantly drawing oil to the truck or holding vessel through the flexible line.

According to the method of the present invention, water is drawn into the first tunnel as the hull is controllably manipulated on the surface of the pond. The position of the contoured gate with respect to the hull is selectively adjusted based upon the thickness of the oil on the surface of the water. The oil/surface water mixture is drawn into the second tunnel as the hull either moves to the oil slick location on the pond, or as the oil slick is drawn to the hull, or both. Substantially all the water drawn into the hull is subsequently discharged from the first tunnel through the lower water outlet, while oil is simultaneously skimmed from the mixture in the second tunnel by passing over the floating gate pivotally positioned on a wall adjacent the water outlet of the second tunnel. The design of the present invention allows the hull to be moved about the surface of the water at a relatively rapid velocity without creating a wake or turbulence which would otherwise decrease the efficiency with which oil is drawn into the second tunnel.

In one embodiment of the invention, the skimmed oil passing over the second floating gate is accumulated in a storage tank between the pontoons. The storage tank is connected to a truck positioned on the shore of the pond by a flexible hose, so that oil is drawn through the flexible hose during a substantially continuous operation to keep the oil level within the storage vessel at a selected level. A power source also on shore is connected to the hull by a plurality of hydraulic lines, and pressurized fluid is passed to the hull for driving the propeller. Accordingly, the floating apparatus of the invention is light-weight and inexpensive. Power means for driving the propeller and thus both manipulating the hull and drawing water into the hull, and pumping means for withdrawing oil from the storage tank, are preferably both provided on shore.

It is an object of the present invention to provide improved techniques for recovering low density liquids, such as oil, on surface water utilizing a floating hull which may be selectively manipulated to various locations on the surface of the water.

It is another object of the present invention to provide a floating device for collecting oil from the surface of water, which may be rapidly moved along the surface of the water for collecting oil without creating significant frontal wakes or turbulences which decrease the efficiency with which oil is collected.

A significant advantage of the present invention relates to the simplicity of the skimming apparatus and thus its high reliability and low manufacturing costs. A feature of the present invention is that a high percentage of oil on the surface water may be easily and quickly collected for subsequent disposal while an unusually high percentage of water initially collected with the oil to assist into the oil recovery operation is discharged back to the pond, thereby reducing the quantity of oil/water mixture which must be subsequently separated and/or transported to a disposal site.

These and further objects, features, and advantages of the present invention will become apparent from the following detailed description, wherein reference is made to the figures in the accompanying drawings.

DETAILED DESCRIPTION OF THE PREFERRED EMBODIMENTS

The techniques of the present invention may be used for collecting a light-density liquid from the surface of a body of heavier density liquid. The invention is particularly suitable for collecting (recovering) hydrocarbon liquids, such as oil, floating on the surface of a body of water, e.g., a retention pond adjacent a manufacturing or production facility. Accordingly, the present invention will be hereinafter described in the environment of collecting oil on the surface of a pond, although it should be understood that the techniques of the present invention may be used in other applications.

Figure 1:
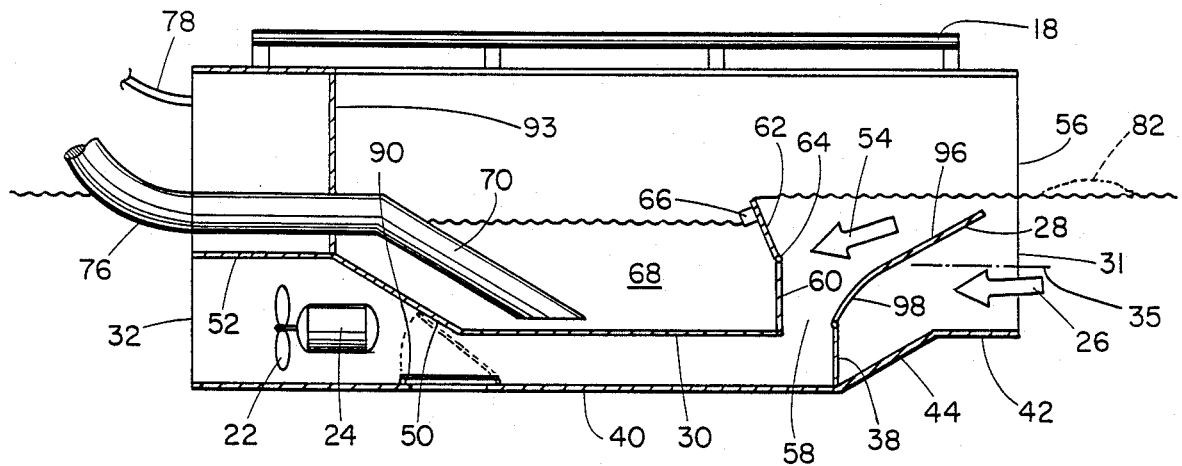
FIG. 1 is a side view, partially in cross-section, of a simplified recovery device according to the present invention.
Figure 2:
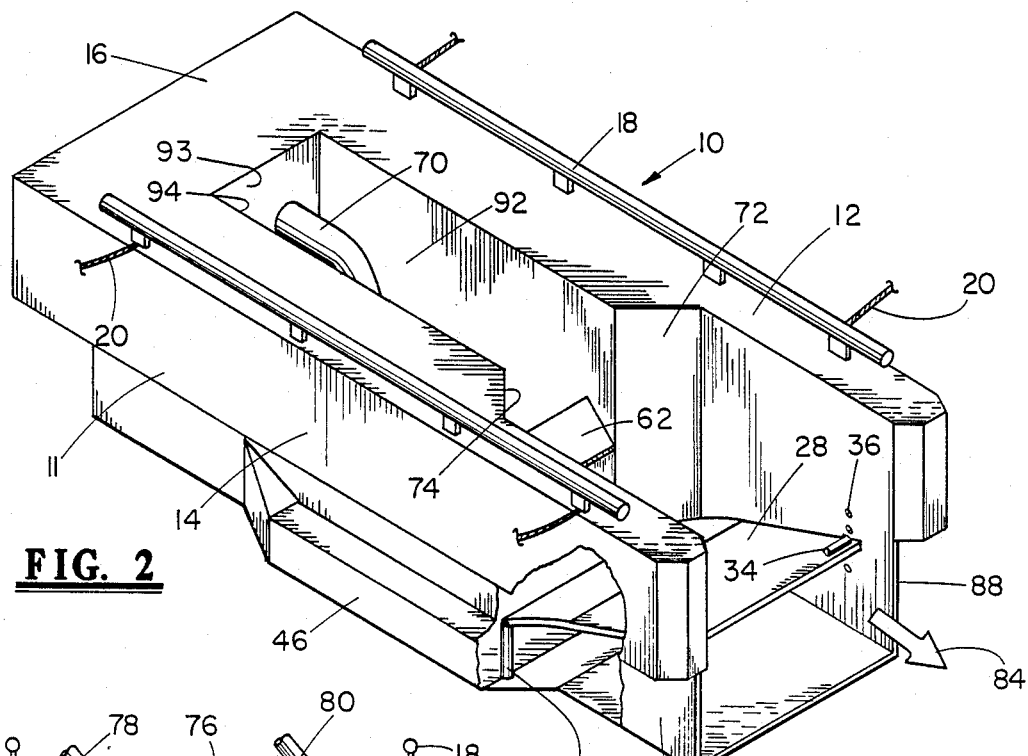
FIG. 2 is a simplified pictorial of the device shown in FIG. 1.

Referring first to FIGS. 1 and 2, there is depicted a suitable embodiment of a skimming vessel or hull 10. The vessel as described herein may, of course, be sized for particular applications, although a suitable vessel 10 would typically have a width of from 4 to 8 feet and a length of from 8 to 16 feet. The vessel 10 as shown in FIG. 1 may be fabricated at least substantially from aluminum, so that the vessel 10 is light-weight and can easily be transported to selected locations.

The skimming vessel 10 comprises a body or hull 11 including a pair of water-tight pontoons 12 and 14, and a water-tight rear section 16. The skimming vessel 10 thus floats on the surface of the body of water, as shown in FIG. 1, since portions of the pontoons 12, 14 and/or the rear section 16 are sealed from the water but are below the surface of the water. If desired, a lightweight material, such as styrofoam, may be placed within the sealed interior of each of the pontoons 12, 14, so that the skimming device 10 would float on the water even if one or both of the pontoons were to inadvertently leak. A pair of guide rails 18 are provided on top of each pontoon for assisting in the manipulation or handling of the hull both within and outside of the water. As explained subsequently, the hull may be self-propelled in the water, although guide wires 20 each extending from the skimming vessel 10 to the shore may also be used to assist in manually manipulating the position of the skimming vessel 10 on the body of water.

Figure 3:
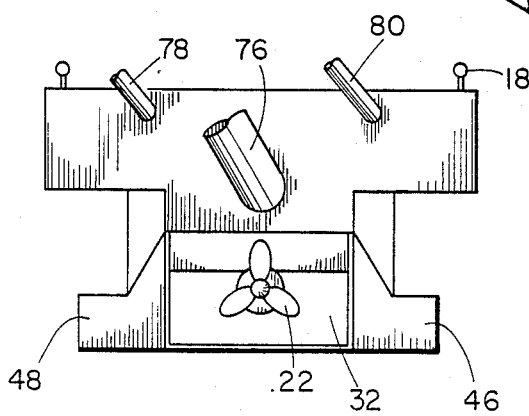
FIG. 3 is a rear view of the apparatus shown in FIG. 1 with fluid lines for interconnecting the hull and equipment on the shore.

The skimming vessel 10 is provided with a propeller 22 driven by a motor 24, as shown in FIGS. 1 and 3. As explained further below, the powered propeller serves at least one of three functions: (1) actuation of the propeller may manipulate the skimming vessel 10 during the skimming operation to a selected location on the pond which evidences an oil slick, (2) the powered propeller may pull both surface water and subsurface water through the hull, thereby enhancing the efficiency of the oil recovery operation, and (3) the propeller may be used for more quickly powering the hull, during a non-skimming mode, to another location on the body of water. It is, however, a feature of the present invention that the power source for driving the motor 24 preferably not be located on the skimming vessel 10. In other words, the motor 24 may be a hydraulically powered motor, although the power source for supplying pressurized hydraulic fluid to the motor 24 may be located on the shore, with hydraulic lines interconnecting the skimming vessel 10 and the on-shore power source (not shown). This feature of the present invention substantially reduces the cost and complexity of the skimming vessel 10, and in part enables the skimming vessel 10 to be lightweight and thus easily manipulated to selected ponds.

The hull of the skimming vessel 10 forms a first enclosed tunnel, designated by the arrow 26, through the body or hull. As shown in FIGS. 1 and 2, a first tunnel is substantially bounded by the vessel floor 40, vessel sidewalls 86 and 88, and the combination of a first contoured gate 28, intermediate floors 30 and 52, and transition member 50 which interconnects the intermediate floors. Thus water from a location below the surface of the pond passes into the first tunnel 26 through inlet 31, passes between the contoured gate 28 and the sections 42, 44 of the floor 40, continues between the intermediate floor 30 and the floor 40, and thence out the discharge port 32 of the first tunnel between intermediate floor 52 and floor 40. Motor 24 thus rotates propeller 22 in a conventional fashion, and pulls subsurface water through the first tunnel 26 within the skimming vessel 10 which, as explained further below, assists in the oil recovery operation.

The hull of the skimming vessel 10 also forms a second tunnel, designated by the arrow 54, through a portion of the body of the hull. The second tunnel has a surface water/oil inlet 56 which is between the contoured gate 28 and the surface of the water, and therefore above the inlet for the first tunnel. The second tunnel has a water discharge port 58 between the rear end of the contoured gate 28 and the vertical wall 60 of the hull. Surface water thus enters the tunnel 54 through inlet 56, and passes through discharge port 58 to mix with the water passing through the tunnel 26 and out the discharge port 32 of the first tunnel.

A second gate 62 is pivotally connected at hinge 64 to the upper end of the wall 60, as shown in FIG. 1, and has a conventional float 66 secured thereto. The gate 62 thus pivots about the hinge 64 with respect to the hull 11, and is buoyancy responsive to the level of water in the second tunnel adjacent the gate 62, as well as the level of oil (or oil/water mixture) in the holding tank 68 within the hull 10. Surface water, with oil, thus enters the second tunnel 54 through the inlet 56 due in part to the "drawing" action created by propeller 22, and/or due to forward movement of the skimming vessel 10 in the body of water. The design of the second tunnel 30 causes the oil within the surface water/oil mixture in the second tunnel to rise toward the surface of the water in tunnel 54 and away from discharge port 58, while the oil itself passes over the top of the gate 62 and into the holding tank 68.

The design of the skimming vessel 10 according to the present invention thus achieves the desired result of easily collecting oil from the surface of the body of water into the skimming vessel 10, while much, if not substantially all, of the water which enters the hull 11 is subsequently discharged from the vessel. Simultaneous with water passing from the vessel to the first tunnel, a high concentration of the oil is collected or recovered in the holding tank 68. Holding tank 68, in turn, is substantially bounded by the intermediate floors 30 and 52, the transition floor 50, intermediate sidewalls 92, 94 and rear wall 93 of the hull 11 and the combination of the vertical wall 60 and the gate 62. A stationary line 70 is positioned within the holding tank 68, and may be used in conjunction with flexible hose 76, as explained subsequently, to draw oil out of the holding tank 68.

Referring again to FIGS. 1 and 2, the contoured gate 28 may comprise a relatively planar section 96 which is generally positioned with its forward end substantially higher than its rearward end, and a contoured section 98 which is weldably connected to the rearward end of section 96. A pair of leg members 38 are each connected to the contoured portion 98, and fix the general position of the rearward end of the gate 28 with respect to the floor 40 and thus the hull 11. The front of the gate 28, in turn, may be selectively positioned with respect to the hull at various locations utilizing the pin members 34 affixed thereto at each side for cooperation with the selectively positioned cavities 36 within the walls 86 and 88. Since all or substantially all of the oil on the surface of the body of water is intended to enter the second tunnel 54 rather than the first tunnel 26, the thickness or depth of the oil on the surface of the body of water will affect the decision as to which of the cavities 36 will receive the pin members 34, and will thus control the position of the front end of the contoured gate 28 within the body of water.

The contoured design of the gate 38 allows a substantial quantity of water to be drawn into the first tunnel 26 without creating a significant amount of turbulence in the area in front of the floating vessel 10. The design of the present invention thus substantially eliminates whirlpools which would otherwise detract from the efficiency with which the skimming vessel 10 recovers oil. As described in U.S. Pat. No. 4,597,863, the drawing of substantial subsurface water through the hull also eliminates or substantially reduces the likelihood of a frontal wake 82 (shown in dashed lines in FIG. 1) on the surface of the water as the hull moves through the water during its skimming operation. In other words, if water were not drawn into the hull through the tunnels in accordance with the present invention and instead the hull was simply manipulated to various locations on the pond in an attempt to collect the oil, the apparatus would tend to create a frontal wake 82 which would otherwise "push" the surface oil away from the hull as the hull moves toward the oil, thereby substantially decreasing the efficiency with which oil is recovered. According to the present invention, however, the surface water and subsurface water are intentially drawn into the skimming vessel 10, and the frontal wake is intentially eliminated. Moreover, the design of the contoured gate 28 in cooperation with the vertical wall 60 and the second gate 62 substantially eliminates turbulence on the surface of the water and prevents whirlpools, so that the skimming vessel 10 may be manipulated about the surface of the water at a skimming velocity substantially higher than that possible according to the design as disclosed in U.S. Pat. No. 4,597,863 while maintaining extremely high oil recovery efficiency.

The concept of the present invention thus includes a skimming vessel with first and second tunnels: the first tunnel receives and discharges substantially only water, and the second tunnel receives surface water and oil, discharges substantially only surface water into the first tunnel, and discharges a comparatively high concentration of oil from the second tunnel into a holding tank on the skimming vessel. As described herein, these operations are occurring simultaneously, and are each the result of the actuation of the propeller 22.

It is a feature of the present invention that the pivot point (vertical position of the hinge 64) be substantially raised above the floor 42 forming the base of the inlet for the first tunnel. In other words, the vertical wall 60 intentially positions the hinge 64 at a location vertically above the floor 42 and preferably above the mean center line 35 (average level) of the inlet 31 of the first tunnel. The action of the gate 62 as shown in FIG. 1 is thus preferred compared, for example, to a design wherein the gate is hinged at a location closely adjacent the intermediate floor 30. Also, the discharge port 58 of the second tunnel is preferably between the vertical wall 60 (which is used to elevate the pivot point for the gate 62) and the rear end of the contoured gate 28.

As shown in FIG. 1, the skimming device 10 may optionally include a gate 90 for substantially blocking the flow of water through a portion of the first tunnel 26, and simultaneously opening a second rear portion of the first tunnel to incoming water. During its skimming mode, as described above, the gate 90 would normally be fully opened, but the gate may be forced close by a manual or powered actuator (not shown), as described in the '863 patent. With the front portion of the first tunnel closed and water entering the rear portion of the first tunnel at a point adjacent the gate 90, powered rotation of the propeller 22 causes the skimming device 10 to behave somewhat similar to a poorly efficient boat, and thus the device may be more rapidly moved to other locations on the pond or body of water with the gate 90 closed.

Guide wires 20, as shown in FIG. 2, are an alternative means of powering the skimming device 10 on the body of the water. It should be understood that since an operator is not normally intended to ride on the skimming device 10, a pair of powered propellers, each responsive to a separate on-shore power means and/or each controlled by radio signals or other conventional transmission means, may be used instead of the guide wires 24 for positioning the skimming vessel 10 on the body of water.

The overall design of the skimming device 10 is best shown in FIG. 2. The holding tank 68 is preferably positioned between pontoons 12, 14. The inlet openings 31, 56 of the first and second tunnels, respectively, preferably have the same width so that the surface water and the subsurface water therebeneath are simultaneously drawn into the second and first tunnels, respectively. The second tunnel 54 preferably narrows considerably between the inlet 56 and the oil outlet for the second tunnel, i.e., the width of the gate 62. Also, the width of the first tunnel substantially broadens from the width of the inlet opening 31 for the first tunnel at the location where the water from the second tunnel 54 merges with the first tunnel. Accordingly, the width of the first tunnel is broadened by the side members 46, 48, which thus enable the first tunnel to occupy a relatively low height at the location below the holding tank 68. As shown in FIG. 1, the lower portion of the inlet 31 for the first tunnel is defined by floor portion 42, which is preferably substantially higher than the primary floor 40 of the skimming vessel. The path of the flow of water of both the first and second tunnels is thus generally inward then downward, at least until the location where the water from the second tunnel merges with with water from the first tunnel. Once the water from the first and second tunnels merge, water continues through the first tunnel between 30 and 40, then is discharged from the outlet port 32 of the first tunnel.

As shown in FIGS. 1-3, the geometric configuration for each of the inlet openings 31, 56 for the first and second tunnels, respectively, as well as the geometric configurations of the outlet openings 32, 68 for the first and second tunnels, respectively, are generally rectangular. It should be understood that the configuration of the inlet and outlet openings, as well as the general configuration of the first and second tunnels through the skimming vessel 10, is based at least in part on manufacturing costs. Inlet and outlet openings of an alternative configuration and tunnels having a different geometric configuration are thus possible and are clearly within the scope of the present invention.

The foregoing disclosure and description of the invention is illustrative and explanatory thereof, and various changes in the method stops as well as in the details of the illustrated apparatus ma be made within the scope of the appended claims without departing from the spirit of the invention.

What is claimed is:

1. A portable skimming apparatus for recovering hydrocarbons floating on the surface of a body of water, the apparatus comprising:

a floating hull defining a first tunnel having an inlet port and a discharge port, a second tunnel, and a holding tank for containing collected hydrocarbons;

a power source positioned remote from and supported independently of the floating hull;

a propeller positioned within the first tunnel for drawing subsurface water through the inlet port of the first tunnel, through the first tunnel and out the discharge port of the first tunnel;

a motor positioned on and supported by the floating hull for powering the propellers;

one or more fluid lines for interconnecting the motor and the power source;

the second tunnel having a hydrocarbon/water inlet port positioned above the inlet port of the first tunnel and at the surface water level for receiving floating hydrocarbons and water into the second tunnel, and having a water outlet port positioned below the hydrocarbon/water inlet port and adjoining the first tunnel between the inlet port of the first tunnel and the propeller, the second tunnel defining a water-filled flow path extending continuously from the second tunnel inlet port to the second tunnel outlet port adjoining the first tunnel; and a buoyancy-responsive skimming gate pivotally secured to the floating hull and defining in part the second tunnel for passing hydrocarbons floating on the surface water in the second tunnel to the holding tank, such that substantially all hydrocarbons received into the second tunnel are passed to the holding tank and substantially all water received into the second tunnel is passed to the discharge port of the first tunnel, thereby separating the hydrocarbons from the water.

2. A portable skimming apparatus as defined in claim 1, further comprising:

a shut-off gate selectively positionable for substantially closing off flow of water through a first portion of the first tunnel and simultaneously opening a second portion of the first tunnel to incoming water such that the propeller propels the skimming device on the surface of the water in a non-skimming mode.

3. A portable skimming apparatus as defined in claim 1, further comprising:

a contour gate secured to the floating hull for separating fluid into the first and second tunnels, and having a front section separating the first tunnel inlet port from the second tunnel inlet port, and having a rear section adjoining the outlet of the second tunnel and the first tunnel.

4. A portable skimming apparatus as defined in claim 3, wherein the location of the front section of the contour gate is selectively positionable with respect to the floating hull to define a selective cross-sectional area of the ports for both the first and second tunnels.

5. A portable skimming apparatus as defined in claim 3, wherein the front section of the contour gate has a substantially planar configuration, and the rear section of the contour gate has an arcuate configuration to enhance hydrocarbon recovery.

6. A portable skimming apparatus as defined in claim 1, wherein a pivot line of the skimming gate with respect to the hull is vertically above a base of the inlet port of the first tunnel.

7. A portable skimming apparatus as defined in claim 1, wherein the inlet port of the first tunnel has a mean level, and a pivot line of the skimming gate with respect to the hull is vertically above the mean level of the first tunnel inlet port.

8. A portable skimming apparatus as defined in claim 1, wherein the hull comprises a substantially vertical wall adjoining the outlet port of the second tunnel; and
the skimming gate is pivotally positioned on an upper portion of the vertical wall.

9. A portable skimming apparatus as defined in claim 1, wherein the skimming gate includes a float responsive to the level of hydrocarbons or water/hydrocarbon mixture in the holding tank.

10. A portable skimming apparatus as defined in claim 1, further comprising:
an oil discharge line for transmitting oil from the holding tank during operation of the portable skimming apparatus.

11. A portable skimming apparatus as defined in claim 1, further comprising:
a pair of elongate pontoons on each side of the skimming apparatus for maintaining the hull floating on the surface of the water; and
the holding tank being positioned between the pair of pontoons.

12. A portable skimming apparatus for recovering a light-density liquid on the surface of a body of heavier-density liquid, the apparatus comprising:
floating hull means defining a first through tunnel having an inlet port and a discharge port, a second tunnel, and a holding tank for containing the collected light-density liquid;
power means positioned within the first tunnel for drawing subsurface heavier-density liquid through the inlet port of the first tunnel, through the first tunnel and out the discharge port of the first tunnel;
contour gate means secured to the floating hull means for separating liquids into the first and second tunnels;
the second tunnel having a light-density liquid/heavier-density liquid inlet port positioned above the inlet port of the first tunnel for receiving light-density liquid and heavier-density liquid into the second tunnel, and having a heavier-density liquid outlet port positioned below the light-density liquid/heavier density liquid inlet port and adjoining the first tunnel between the inlet port of the first tunnel and the power means, the second tunnel defining a heavier-density liquid flow path extending generally downward from its inlet port to its outlet port; and
skimming gate means pivotally secured to the hull and defining in part the second tunnel for passing the light-density liquid floating on the surface of the heavier-density liquid from the second tunnel to the holding tank, such that substantially all light-density liquids received into the second tunnel are passed to the holding tank and substantially all heavier-density liquids received into the second tunnel are passed to the discharge port of the first tunnel, thereby separating the light-density liquid and the heavier-density liquid.

13. A portable skimming apparatus as defined in claim 12, further comprising;
a shut-off gate selectively positionable for substantially closing off flow of water through a first portion of the first tunnel and simultaneously opening a second portion of the first tunnel to incoming water such that the power means propels the skimming device on the surface of the water in a non-skimming mode.

14. A portable skimming apparatus as defined in claim 12, wherein the contour gate means has a front section selectively positionable with respect to the floating hull to define a size of the inlet ports for the first and second tunnels.

15. A portable skimming apparatus as defined in claim 12, wherein the contour gate means has a front substantially planar section for separating the first tunnel inlet port from the second tunnel inlet port, and has a rearward arcuate section secured to the first section and adjoining the outlet of the second tunnel and the first tunnel for enhancing recovery of the light-density fluid.

16. A portable skimming apparatus as defined in claim 12, wherein the inlet port of the first tunnel has a mean level, and a pivot line of the skimming gate with respect to the hull is vertically above the mean level of the first tunnel inlet port.

17. A portable skimming apparatus as defined in claim 12, wherein the hull comprises a substantially vertical wall adjoining the outlet port of the second tunnel; and
the skimming gate is pivotally positioned on an upper portion of the vertical wall.

18. A portable skimming apparatus as defined in claim 12, further comprising:
a propellor positioned within the first tunnel for drawing water through the first tunnel;
a hydraulic motor for powering the propeller; and
one or more fluid lines for interconnecting the hydraulic motor with a remote power source.

19. A method for skimming and recovering hydrocarbons floating on the surface of a body of water, the method comprising:
providing a floating hull defining a first tunnel having an inlet port and a discharge port, a second tunnel, and a holding tank for containing collected hydrocarbons;
drawing subsurface water through the inlet port of the first tunnel, through the first tunnel and out the discharge port of the first tunnel;
forming the second tunnel with a hydrocarbon/water inlet port positioned above the inlet port of the first tunnel and at the surface water level for receiving floating hydrocarbons and water into the second tunnel;
directing water in the second tunnel down and toward an outlet port adjoining the first tunnel between the inlet port of the first tunnel and the discharge port of the first tunnel, such that the second tunnel is continually filled with water between its inlet port and its outlet port;
pivotally securing a buoyancy-responsive skimming gate to the hull and defining in part the second tunnel; and
passing substantially all hydrocarbons floating on the surface water in the second tunnel over the skimming gate and to the holding tank, thereby separating the hydrocarbons from the water.

20. A method of skimming and recovering hydrocarbons as defined in claim 19, wherein the step of drawing subsurface water through the inlet port comprises:

providing a power source remote from and supported independently of the hull;
supporting a motor on the hull for rotating a propeller to draw subsurface water through the inlet port of the first tunnel; and
interconnecting the motor on the hull and the power source with one or more fluid lines, such that the floating hull does not support the weight of the power source.

* * * * *